United States Patent

Holmes

[15] 3,693,784
[45] Sept. 26, 1972

[54] WIRE PACKAGE

[72] Inventor: William T. Holmes, 219 Spring St., Carrollton, Ga. 30117

[22] Filed: Jan. 8, 1971

[21] Appl. No.: 104,904

[52] U.S. Cl. ................206/52 W, 206/59 B, 324/51
[51] Int. Cl. .......................B65d 83/00, B65d 85/04
[58] Field of Search ......206/52 W, 52 R, 59 A, 59 B; 324/51, 66, 73

[56] References Cited

UNITED STATES PATENTS

| 3,150,769 | 9/1964 | Cohn | 206/52 W |
|---|---|---|---|
| 485,712 | 11/1892 | Rogers | 206/52 R |
| 3,217,245 | 11/1965 | Ingmanson | 324/51 |
| 3,515,269 | 6/1970 | Furtado | 206/52 W |
| 3,332,546 | 7/1967 | DeGeorge | 206/52 R |

*Primary Examiner*—William T. Dixson, Jr.
*Attorney*—Jones & Thomas

[57] ABSTRACT

A package for cable or the like wherein a reel wound with insulated multiple conductor cable is enclosed in a container. The container includes recesses in its sidewalls which receive the end flanges of the reel and circular openings in its sidewalls which receive end protrusions or bosses of the reel spindle. The inner end of the cable on the reel is inserted through a passageway in the spindle which opens through the end of the spindle so that both the inner and outer ends of the cable are accessible for electrically testing the conductors. The wire can be pulled from the container and the reel will rotate inside the container to pay out the wire.

9 Claims, 13 Drawing Figures

PATENTED SEP 26 1972 3,693,784

INVENTOR
WILLIAM T. HOLMES

BY Jones & Thomas
ATTORNEYS

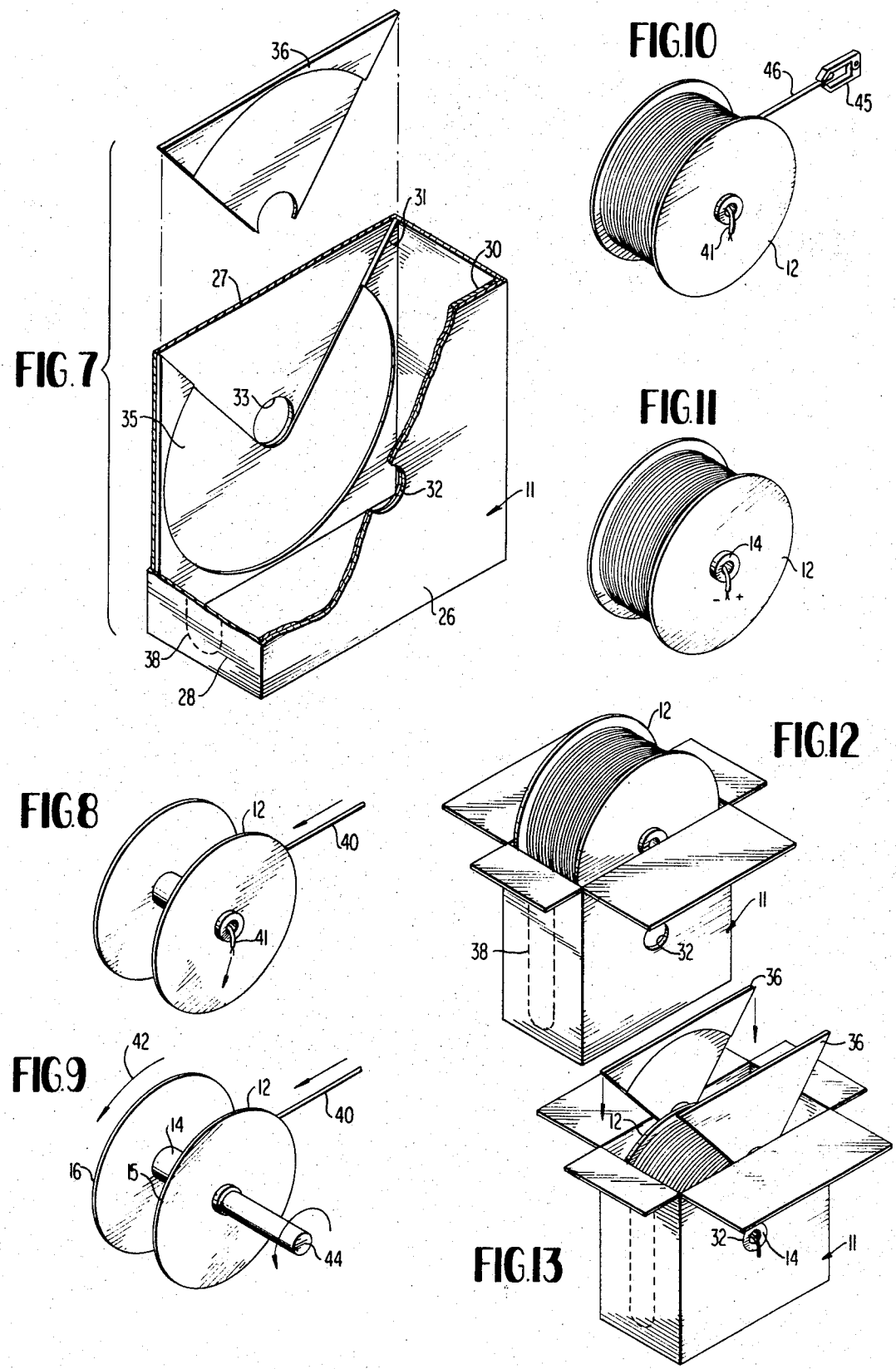

WIRE PACKAGE

BACKGROUND OF THE INVENTION

Wire or cable, such as insulated multiple conductor service entrance cable for houses, buildings, etc., is usually wound in a coil and packaged in a box for storage and shipment from the manufacturing plant to the place where it is to be installed. The cable is usually withdrawn from the center of the coil through the side of the box merely pulling the cable. When a building etc., is being wired the electrician normally pulls a supply of cable from the box and then pulls the cable through the openings in the studs, etc. of the building. The cable is usually pulled from the center of its coil through an opening in the side of the box and it becomes twisted as it is withdrawn from its box. When each loop of the coiled cable is withdrawn from the package, a full three hundred and sixty degree twist is formed in the cable. The twists in the cable tends to form kinks in the cable, and the twists make it difficult for the electrician to pull the cable through the relatively small openings formed in the studs, etc. which accommodate the passage of the cable in the framework of the building. The difficulty encountered in withdrawing the cable from the package and pulling the twisted cable is so great that two electricians are frequently required; one to pull the cable from the box and feed the cable to the studs, and the other to pull and thread the leading end of the cable through the openings in the studs. Also, the kinks which are occasionally formed in the cable because of the twisting of the cable as it leaves the wire package occasionally cause the cable to bind between the studs, and if not detected, cause a break in one of the conductors of the cable or damage to the insulation around the conductors.

SUMMARY OF THE INVENTION

Briefly described, the present invention comprises a package of wire, particularly service entrance cable for houses, buildings, etc. The package comprises a container having square sidewalls which define small circular openings at their centers, and larger circular recesses on their inside faces. A reel is positioned inside the container and includes circular end flanges received in the circular recesses of the container sidewalls, and a spindle having end protrusions or bosses which extend beyond the end flanges into the circular openings of the container sidewalls. The spindle defines an opening or passageway which extends from the surface of the spindle between the end flanges to an end of the spindle. The inner end of the wire extends through the spindle passageway and is accessible through the end of the spindle. The wire can be paid out from the reel at a tangent from the reel through an opening in a peripheral wall of the container and the reel rotates inside the container. No twists are formed in the wire as it is paid out from the container.

Thus, it is an object of this invention to provide a package of wire or the like which allows the wire to be progressively taken from the package without causing twists or kinks in the wire, and which is rugged and convenient to store and handle.

Another object of this invention is to provide a package of service entrance cable and the like which causes the cable to be taken from the package in a manner which expedites the installation of the cable at a construction site.

Another object of this invention is to provide a package of service entrance cable or the like which includes a reel which expediently receives the cable and allows the cable to be electrically tested while wound on the reel.

Other objects, features and advantages of the present invention will become apparent upon reading the following specification when taken into conjunction with the accompanying drawing.

BRIEF DESCRIPTION OF THE DRAWING

FIG. 7 is a perspective view with parts broken away and exploded, of a container.

FIGS. 8, 9, 10, 11, 12, 13 are progressive schematic illustrations of the manner in which the wire is wound upon a reel, electrically tested, and inserted into a container.

DESCRIPTION OF THE PREFERRED EMBODIMENTS

Figure 1:
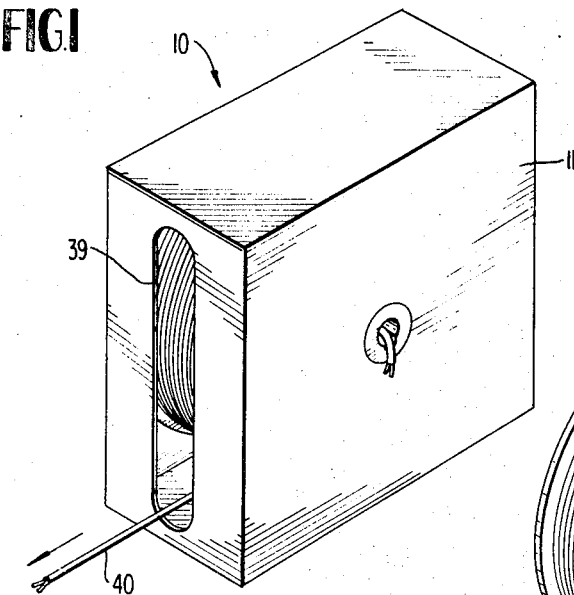
FIG. 1 is a perspective view of a package of wire, showing the manner in which the wire is withdrawn from the package.
Figure 2:
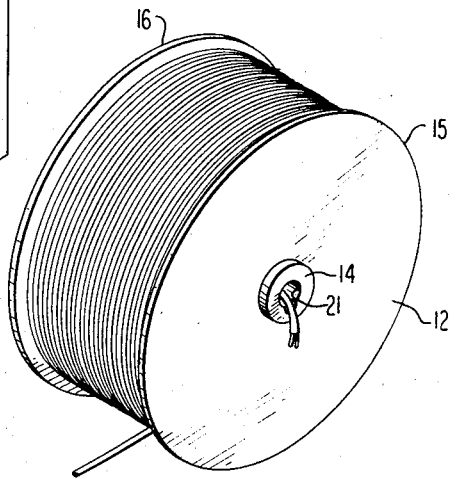
FIG. 2 is a perspective view of a reel having wire wound thereon.
Figure 3:
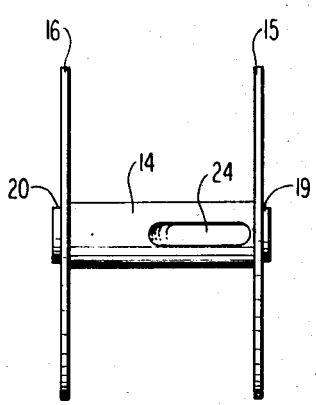
FIG. 3 is an end view of a reel.
Figure 4:
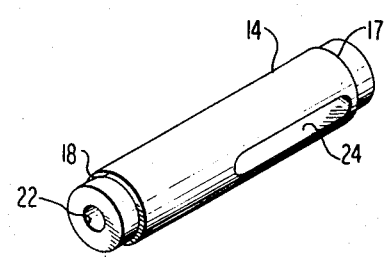
FIGS. 4 and 5 are perspective views of a spindle of a reel.
Figure 5:
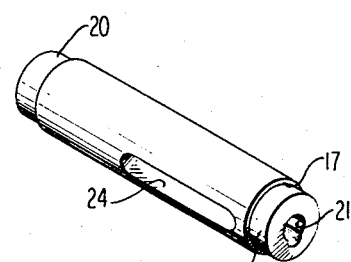
Figure 6:
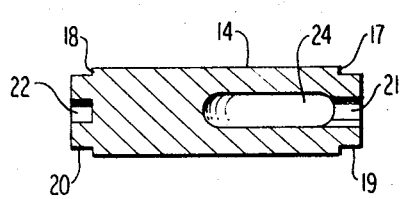
FIG. 6 is a cross sectional view of a spindle.

Referring now in more detail to the drawing, in which like numerals indicate like parts throughout the several views, FIG. 1 shows a package of wire 10 which includes a generally rectangular container 11. A reel 12 (FIG. 2) is placed in container 11 and includes a spindle 14 and end flanges 15 and 16 mounted at the ends of spindle 14. As is illustrated in FIGS. 3-6, end flanges 15 and 16 define central openings which are inserted over the ends of spindle 14 with a wedge fit. The spindle includes a conventional positioning means such as shoulders 17 and 18 for properly positioning the end flanges on the spindle, and the necked down portions 19 and 20 of the spindle form end bosses or protrusions which extend beyond the outer surfaces of the end flanges. Bores or openings 11 and 22 are formed in the ends of spindle 14 and are aligned with the longitudinal axis of the spindle. Opening or passageway 24 extends from the surface of spindle 14 between end flanges 15 and 16 through one end of the spindle. The passageway intersects bore 21. Passageway 24 is gradually curved in the vicinity of the surface of the spindle between end flanges 15 and 16 so that when a wire is thrust into passageway 24, the wire will be guided from a direction generally normally to the longitudinal axis of the spindle, through the passageway and then out the end of the spindle in a direction generally parallel to the longitudinal axis of the spindle.

As is illustrated in FIG. 7, container 11 comprises a generally rectangular box having square sidewalls 26 and 27 and peripheral walls 28. Sidewall inserts 30 and 31 are placed in abutment with sidewalls 26 and 27 respectively. Aligned circular openings 32 and 33 are formed in the sidewalls and sidewall inserts. Circular recesses 35 are formed in the facing surfaces of sidewall inserts 30 and 31. The circular recesses 35 are concentric with circular openings 32 and 33. Circular openings 32 and 33 are of a diameter slightly larger than the diameter of end bosses 19 and 20 of spindle 14 while circular recesses 35 are of a diameter slightly larger than the diameter of end flanges 15 and 16.

Sidewall inserts 30 and 31 are perforated with a line of perforations which extend in a V-shape from the upper corners of the inserts to a tangent with the circular openings of the sidewall inserts so that wedges 36 can be removed from the sidewall inserts, in the manner illustrated in FIG. 7. A peripheral wall 28 also includes perforations to form a tear away portion 38 that can be removed to form an elongated slot or opening 39 through which the wire on reel 12 can be paid out.

The facing surfaces of sidewall inserts 30 and 31 are coated with a lubricating substance so as to render the surfaces smooth and generally function-free to accommodate the rotation of the end flanges 15 and 16 of reels 12. The lubricating substances are conventional and form no significant part of this invention.

Recesses 35 in sidewall inserts 30 and 31 can be formed by compressing the sidewall inserts 30 and 31, or by a buildup of material about the center portion of the sidewall inserts.

As is illustrated in FIG. 8, wire 40, such as a multiple conductor cable, is wound upon reel 12 by inserting the lead or inner end 41 of the wire through the passageway 24 of the spindle until the inner end 41 is exposed at the end of the spindle. Reel 12 is then rotated in either direction as indicated by arrow 42 by means of a rotating tool 44. Rotating tool 44 can be a splined axle inserted into an end opening 21 or 22 of the spindle, a socket surrounding a protruding end boss 19 or 20, or any other conventional means. The wire is accumulated about s spindle 14 between end flanges 15 and 16 until the reel is substantially full of wire. The supply of wire then is cut.

If desired, the insulated multiple conductors of a multiple conductor cable wound upon reel 12 can be electrically connected to one another by penetrating the insulation of the wires with a clamp 45 or the like. The cable can be clamped at its outer free end 46 or at its inner end 41. When the conductors of the cable have been connected by means of the clamp 45 or by a similar means, the electrical conductivity of the conductors can be tested from one end of the cable by applying a voltage to one conductor of the cable and testing the other conductors of the cable with a voltage meter. If any breaks or separations appear in any of the conductors of the cable they will be detected by a test of this type.

After the wire has been tested, the reel is placed in a container 11 by removing the wedges 36 of the sidewall inserts 30 and 31, slightly bowing the sidewalls 26 and 27 of the container and dropping the reel into the container. The protruding end bosses 19 and 20 of the reel will pop through the aligned circular openings 32 and 33 and the end flanges 15 and 16 will be located in the recesses 35 of the sidewall inserts. As is illustrated in FIG. 13, the wedges 36 are then replaced in their original position by inserting the wedges down between the container sidewalls and the reel. The flaps of the container are then sealed closed and the package of wire is then ready for shipment, storage, etc.

The inner end of cable 40 is exposed through the end of spindle 14, and if the clamp 45 (FIG. 10) has been applied to the outer free end of the cable, the conductors of the cable can be tested at the point of delivery by applying a voltage to one of the conductor and testing one of the conductors in the manner as illustrated in FIG. 11. This can be done without opening the container or removing the reel or cable from the container.

When an electrician is ready to pay out the cable from the container, the perforations in the peripheral wall 28 of the container allow the slot 39 to be formed in the peripheral wall, and the cable 40 can be pulled at a tangent with respect to the cable wound upon the reel. The reel will tend to rotate inside the container as the cable is pulled from the container. The lubricated surfaces of the sidewall inserts 30 and 31 allow the end flanges 15 and 16 of the reels to rotate inside the container. The aligned circular openings 32 and 33 in he sidewalls and sidewall inserts of the container rotatably support the reel within the container. Recesses 35 of the sidewall inserts 30 and 31 also function as a secondary support for the reel, and keep the wire 40 from getting tangled or wedged between the sidewall of the container and the end flanges of the reel. Wedges 36 of the sidewall inserts 30 and 31 allow the container 11 to be positioned in an inverted attitude as the wire is being paid out from the container and the reel will still be free to rotate in the container. Also, because of the lubrication on the facing surfaces of the sidewall inserts, the container can be placed on its side and the cable can still pay out from the container. Thus, the package of wire can be placed in virtually any attitude and the wire will still pay out of the container.

Container 11 can be fabricated of several conventional materials, including corrugated cardboard, plastic, etc. The sidewall inserts can be fabricated of the same materials as the container 11, or can be fabricated of different materials, such as polystyrene, etc. Reel 12 also can be fabricated of plastics, cardboard, wood, etc.

While this invention has been described in detail with particular reference to preferred embodiments thereof, it will be understood that variations and modifications can be effected within the spirit and scope of the invention as described hereinbefore and as defined in the appended claims.

I claim:

1. A package for wire or the like comprising a container having generally flat sidewalls and peripheral walls, aligned circular openings centrally positioned in said sidewalls, a circular recess defined in the inner surfaces of said sidewalls coaxially with said aligned openings, a reel having a spindle, end flanges, and protrusions extending coaxially with respect to said spindle from said end flanges, said spindle defining an opening therein generally transverse to its longitudinal axis for receiving wire, and at least one of said protrusions defining an opening in alignment with the longitudinal axis of said spindle, said protrusions of said reel being received in the aligned circular openings of said container sidewalls and said end flanges of said reel being received in the circular recesses of said container sidewalls.

2. The package of claim 1 and wherein the openings in said protrusions are non-circular.

3. The package of claim 1 and wherein one of said peripheral walls defines an opening smaller than the size of said reel for the passage of wire or the like.

4. The package of claim 1 and wherein said spindle and protrusions are formed from a single element, and said end flanges each define a central opening inserted about said protrusions.

5. The package of claim 1 and wherein said protrusions are of smaller diameter than said spindle.

6. The package of claim 1 and wherein said container is substantially rectangular.

7. A package for wire or the like comprising a substantially rectangular container having substantially square sidewalls, sidewall inserts juxtaposed the inside surfaces of said sidewalls, each sidewall insert defining a large circular recess substantially coaxial with the centers of said sidewalls, each of said sidewalls and sidewall inserts defining a circular opening smaller than said recesses and substantially coaxial with the centers of said sidewalls, a reel for storing wire positioned in said container and comprising a spindle, circular end flanges and circular protrusions, said end flanges being sized to snugly fit in the recesses of said container, said protrusions being positioned coaxially with respect to said end flanges and sized to snugly fit in the circular openings of said sidewalls, said spindle defining a wire receiving opening intermediate its ends, and said circular protrusions defining openings generally aligned with the longitudinal axis of said spindle.

8. A package of insulated multiple conductor cable or the like comprising a container including generally flat side walls and peripheral walls and means for forming an opening in one of said peripheral walls for the passage therethrough of cable, a reel rotatably supported in said container, said reel and said container including approximately aligned openings in a side wall of said container and in the side portion of said reel, a length of multiple conductor insulated cable or the like wound on said reel with one end of the cable at the inner portion of the reel extending through the approximately aligned openings in the side wall of said container and in the side portion of said reel and the other end of the cable at the peripheral portion of the reel, whereby the end of the cable at the inner portion of the reel is accessible from outside the package without opening the package.

9. A package of multiple conductor insulated cable or the like comprising a reel including a spindle with end flanges mounted on said spindle at its ends, said spindle including a passageway from the surface of the spindle at a position between said end flanges and opening at a position on the other side of one of said end flanges, a forming an of multiple conductor insulated cable wound on said reel about said spindle with one end of said cable inserted into said passageway between said end flanges and extending beyond one of said end flanges to the side portion of said reel and with the conductors of the cable at the other end of the cable electrically connected together, a container enclosing said reel and said cable, said container including peripheral walls and substantially flat side walls, both of said side walls defining central openings therethrough in alignment with and rotatably supporting the ends of said spindle, and means for forming an opening in a peripheral wall of said container whereby the cable can be pulled along its length from the reel.

* * * * *